United States Patent
Oh

(10) Patent No.: US 9,592,571 B2
(45) Date of Patent: Mar. 14, 2017

(54) LASER APPARATUS FOR WELDING

(71) Applicants: Hyundai Motor Company, Seoul (KR); Kia Motors Corporation, Seoul (KR)

(72) Inventor: Kwang Min Oh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/879,608

(22) Filed: Oct. 9, 2015

(65) Prior Publication Data

US 2016/0031039 A1    Feb. 4, 2016

Related U.S. Application Data

(62) Division of application No. 13/493,197, filed on Jun. 11, 2012, now Pat. No. 9,168,610.

(30) Foreign Application Priority Data

Oct. 13, 2011   (KR) .................... 10-2011-0104654

(51) Int. Cl.
  *B23K 26/00* (2014.01)
  *B23K 26/21* (2014.01)
  (Continued)

(52) U.S. Cl.
  CPC .......... *B23K 26/073* (2013.01); *B23K 1/0056* (2013.01); *B23K 20/008* (2013.01);
  (Continued)

(58) Field of Classification Search
  CPC ...... B23K 1/005; B23K 1/0056; B23K 26/00; B23K 26/20; B23K 26/21; B23K 26/211; B23K 26/34; B23K 26/073; B23K 26/06
  (Continued)

(56) References Cited

U.S. PATENT DOCUMENTS 3,383,491 A   5/1968  Muncheryan
4,700,044 A  10/1987  Hokanson et al.
(Continued)

FOREIGN PATENT DOCUMENTS

CN   1806995 A   7/2006
CN   1817547 A   8/2006
(Continued)

*Primary Examiner* — David Angwin
*Assistant Examiner* — Michael Laflame, Jr.
(74) *Attorney, Agent, or Firm* — Mintz Levin Cohn Ferris Glovsky and Popeo, P.C.; Peter F. Corless

(57) ABSTRACT

A laser apparatus for welding is disclosed. The laser apparatus includes: a laser optic head adapted and configured to modify a spot size of a laser beam oscillated by a laser oscillator and to project the laser beam into a joining portion of joining members, wherein the laser optic head is adapted and configured to modify the spot size to selectively perform brazing or welding. A method of selectively brazing or welding according to one or more exemplary embodiments of the present invention includes: providing a laser apparatus of as described herein; and actuating the laser optic head to modify the spot size of the laser beam and project the laser beam into the joining portion of the joining members to selectively perform brazing or welding.

10 Claims, 5 Drawing Sheets

(51) Int. Cl.
*B23K 26/34* (2014.01)
*B23K 26/06* (2014.01)
*B23K 26/073* (2006.01)
*B23K 1/005* (2006.01)
*B23K 26/03* (2006.01)
*B23K 26/04* (2014.01)
*B23K 26/20* (2014.01)
*B23K 31/12* (2006.01)
*B23K 26/14* (2014.01)
*B23K 20/00* (2006.01)
*B23K 26/08* (2014.01)

(52) U.S. Cl.
CPC ............ *B23K 26/03* (2013.01); *B23K 26/032* (2013.01); *B23K 26/037* (2015.10); *B23K 26/046* (2013.01); *B23K 26/0643* (2013.01); *B23K 26/0648* (2013.01); *B23K 26/0869* (2013.01); *B23K 26/14* (2013.01); *B23K 26/142* (2015.10); *B23K 26/20* (2013.01); *B23K 26/206* (2013.01); *B23K 26/21* (2015.10); *B23K 26/211* (2015.10); *B23K 26/702* (2015.10); *B23K 31/125* (2013.01)

(58) Field of Classification Search
USPC ............ 219/55, 60, 61, 85.12, 85.13, 85.14, 219/85.15, 85.22, 121.13, 121.14, 121.6, 219/121.61–121.66, 121.73–121.75, 219/121.78–121.85
See application file for complete search history.

(56) References Cited

U.S. PATENT DOCUMENTS

| | | | |
|---|---|---|---|
| 5,168,143 A * | 12/1992 | Kobsa | B23K 26/06 219/121.72 |
| 5,407,119 A | 4/1995 | Churchill et al. | |
| 5,525,777 A * | 6/1996 | Kukuljan | B23K 1/0056 219/121.65 |
| 5,998,758 A * | 12/1999 | Moser | B23K 26/04 219/121.63 |
| 6,144,008 A | 11/2000 | Rabinovich | |
| 6,394,158 B1 * | 5/2002 | Momeni | B23K 1/0056 156/272.8 |
| 6,706,998 B2 | 3/2004 | Cutler | |
| 7,291,805 B2 | 11/2007 | Dane et al. | |
| 7,880,117 B2 * | 2/2011 | Li | B23K 26/04 219/121.7 |
| 7,994,452 B2 * | 8/2011 | Sawabe | B23K 26/04 219/121.75 |
| 8,450,639 B2 * | 5/2013 | Reitemeyer | B23K 26/046 219/121.67 |
| 8,796,582 B2 | 8/2014 | Kawai et al. | |
| 2004/0007563 A1 | 1/2004 | Hastings | |
| 2004/0045323 A1 | 3/2004 | Schultz et al. | |
| 2004/0169021 A1 | 9/2004 | Baker et al. | |
| 2005/0013328 A1 | 1/2005 | Jurgensen | |
| 2005/0041697 A1 | 2/2005 | Seifert et al. | |
| 2006/0061854 A1 | 3/2006 | Dane et al. | |
| 2007/0193984 A1 | 8/2007 | Kawai et al. | |
| 2007/0221637 A1 * | 9/2007 | Schurmann | B23K 26/03 219/121.63 |
| 2008/0023453 A1 | 1/2008 | Zhang | |
| 2008/0029498 A1 | 2/2008 | Forrest et al. | |
| 2008/0031298 A1 * | 2/2008 | Sakai | B23K 26/0648 372/55 |
| 2008/0073438 A1 | 3/2008 | Gu et al. | |
| 2008/0116175 A1 | 5/2008 | Ballerini et al. | |
| 2008/0208105 A1 | 8/2008 | Zelickson et al. | |
| 2008/0216575 A1 | 9/2008 | Klein et al. | |
| 2008/0223831 A1 | 9/2008 | Yoshikawa | |
| 2008/0257870 A1 | 10/2008 | Longfield et al. | |
| 2008/0310789 A1 | 12/2008 | Mihailov et al. | |
| 2009/0050611 A1 | 2/2009 | Sukhman et al. | |
| 2009/0067455 A1 | 3/2009 | Murison et al. | |
| 2009/0095214 A1 | 4/2009 | Whitfield | |
| 2009/0108190 A1 | 4/2009 | Plewa et al. | |
| 2009/0136178 A1 | 5/2009 | Pirastu | |
| 2009/0162994 A1 | 6/2009 | Sakamoto | |
| 2009/0221422 A1 | 9/2009 | Miller | |
| 2009/0244508 A1 | 10/2009 | Schoeppach et al. | |
| 2009/0245305 A1 | 10/2009 | Jensen et al. | |
| 2009/0258233 A1 | 10/2009 | Bolser et al. | |
| 2009/0272724 A1 | 11/2009 | Gubler et al. | |
| 2009/0314751 A1 | 12/2009 | Manens et al. | |
| 2010/0002743 A1 | 1/2010 | Markov et al. | |
| 2010/0006548 A1 | 1/2010 | Atsumi et al. | |
| 2010/0206854 A1 * | 8/2010 | Nakai | B23K 1/0056 219/121.6 |
| 2011/0095002 A1 | 4/2011 | Katayama et al. | |
| 2011/0097598 A1 | 4/2011 | McNutt et al. | |
| 2011/0100967 A1 | 5/2011 | Yoo et al. | |
| 2011/0108530 A1 | 5/2011 | Martin et al. | |
| 2012/0267349 A1 * | 10/2012 | Berndl | B23K 26/03 219/121.65 |

FOREIGN PATENT DOCUMENTS

| | | |
|---|---|---|
| CN | 101088696 A | 12/2007 |
| CN | 101195183 A | 6/2008 |
| CN | 101351294 A | 1/2009 |
| CN | 101376195 A | 3/2009 |
| CN | 101941119 A | 1/2011 |
| DE | 102009045400 B3 * | 6/2011 |
| JP | 64-034591 A | 2/1989 |
| JP | 08-052512 A | 2/1996 |
| JP | 2007-044739 A | 2/2002 |
| JP | 2003225784 A | 8/2003 |
| JP | 2004174529 A | 6/2004 |
| JP | 2005-169397 A | 6/2005 |
| JP | 2006175481 A | 7/2006 |
| JP | 2007-000909 A | 1/2007 |
| JP | 2007-039716 A | 2/2007 |
| JP | 2007-181840 A | 7/2007 |
| JP | 2007229773 A | 9/2007 |
| JP | 2008000814 A | 1/2008 |
| JP | 2008-168352 A | 7/2008 |
| JP | 2009-056508 A | 3/2009 |
| JP | 2011-143420 A | 7/2011 |
| KR | 10-2011-0000399 | 1/2011 |
| KR | 10-2011-0002701 | 1/2011 |
| KR | 10-2011-0045121 | 5/2011 |
| WO | 2009/026808 A1 | 3/2009 |

* cited by examiner

LASER APPARATUS FOR WELDING

CROSS-REFERENCE TO RELATED APPLICATION

This application is a divisional of U.S. patent application Ser. No. 13/493,197, filed Jun. 11, 2012, which claims under 35 U.S.C. §119 (a) the benefit of Korean Patent Application No. 10-2011-0104654 filed on Oct. 13, 2011, the entire contents of which are incorporated herein by reference.

FIELD OF THE INVENTION

The present invention relates to a laser apparatus for welding. More particularly, the present invention relates to a laser apparatus for welding that enables brazing or laser welding that joins two joining members or panels by using a laser beam through one apparatus.

BACKGROUND OF THE INVENTION

Recently, a laser beam is increasingly used in cutting, welding, and heat treatment of metal members due to cost reduction, factory automation, and quality improvement.

Primary issues required for applying the laser beam are such that energy distribution of the laser beam is uniformized, laser output is controlled so as to maintain a constant heat treatment temperature, shooting speed of the laser beam is optimized so as to satisfy productivity and quality, and energy absorption ratio is maximized. That is, cost reduction and quality improvement can be achieved when applying the laser beam if the primary issues are satisfied.

Herein, joining method for joining two joining members or panels by using the laser beam is divided into brazing and welding.

Firstly, brazing is a metal-joining process where the joining members are not melted but a filler metal is melted since non-ferrous metal or non-ferrous metal alloy (e.g., solder or braze) having a lower melting point than the joining members is used as the filler metal. In this case, the molten filler metal is diffused between the joining members by capillary phenomenon and a base metal constituting the joining members is wet by the molten filler metal. After that, if the filler metal and the joining member are cooled, the joining members are joined.

The laser brazing, compared with spot welding, can enhance degree of design freedom and productivity due to beautiful appearance, reduce cost since there is no need to spray molding or sealer into a joining portion, and improve strength of a vehicle body due to spreading stress of the joining portion. So as to obtain good brazing quality, the panels, focus of the laser beam, and an end of a filler wire should be aligned.

In addition, the laser welding is a metal-joining process where, in a state that two joining members (panels) are overlapped with each other, the laser beam is shot into a welding portion (joining portion) so as to melt the panels. In this case, a molten metal is pushed to an opposite direction of welding progress by a pressure of plasma occurring around a laser welding portion. After that, the molten metal is solidified and a welding bead is produced such that the joining members (panels) are joined by the welding bead.

Quality of laser welding is affected by gap size between the joining members. If sufficient space for expanding gasses to pass does not exist, the gas breaks through or caves the welding bead. Therefore, breakage of the welding portion can occur.

Accordingly, an additional apparatus for applying pressure to or clamping the joining members is essentially required so as to maintain a gap between the joining members.

A laser apparatus used in the laser brazing or welding includes a laser optic head in which a plurality of lenses is provided. The laser optic head is adapted to shoot the laser beam oscillated by the laser oscillator into the welding portion.

According to a conventional laser apparatus, an apparatus for supplying the filler metal is essentially required when the brazing, and the additional apparatus for applying pressure to or clamping the joining members is essentially required when welding. Therefore, initial investment cost can increase.

In a case that the laser brazing and the laser welding are simultaneously used for joining two joining members, one of the brazing and the welding should be performed after the other of the brazing and the welding was performed. Therefore, working hours are very long.

Because the brazing and the welding cannot be performed by one laser apparatus, manufacturing cost can increase.

The above information disclosed in this Background section is only for enhancement of understanding of the background of the invention and therefore it can contain information that does not form the prior art that is already known in this country to a person of ordinary skill in the art.

SUMMARY OF THE INVENTION

The present invention has been made in an effort to provide a laser apparatus for welding having advantages of reducing manufacturing cost, shortening working hours, and enhancing productivity by enabling of brazing or laser welding that joins two joining members or panels through one apparatus.

A laser apparatus for welding according to one or more exemplary embodiments of the present invention includes: a laser optic head adapted and configured to modify a spot size of a laser beam oscillated by a laser oscillator and to project the laser beam into a joining portion of joining members, wherein the laser optic head is adapted and configured to modify the spot size to selectively perform brazing or welding.

In one or more exemplary embodiments of the present invention, the laser apparatus further includes a mounting frame In one or more exemplary embodiments of the present invention, the laser apparatus further includes a wire feeder supplying a filler metal into the laser beam projected by the laser optic head so as to perform the brazing.

In one or more exemplary embodiments of the present invention, the wire feeder is disposed at a side portion of the laser optic head and is mounted at the mounting frame.

In one or more exemplary embodiments of the present invention, the laser apparatus further includes a roller unit adapted to apply pressure to an upper portion of the joining members so as to control a gap between the joining members when laser welding the joining members.

In one or more exemplary embodiments of the present invention, the roller unit is mounted at the mounting frame and is movable upwardly or downwardly to the mounting frame.

In one or more exemplary embodiments of the present invention, the roller unit includes: a mounting bracket mounted at the mounting frame ahead of the laser optic head; an operating cylinder provided with an operating rod and mounted at a side portion of the mounting bracket, the operating rod being mounted at the operating rod so as to be movable upwardly or downwardly; and a roller connected to a front end of the operating rod, movably mounted at the operating cylinder through guide means, and adapted to slidably contact on an upper surface of the joining member according to the movement of the operating rod and to apply pressure to the joining members.

In one or more exemplary embodiments of the present invention, the guide means includes: a rail mounted at a surface of the operating cylinder along a length direction thereof; and a rail block slidably mounted on the rail, connected to the operating rod, and having a front end at which the roller is mounted through a connecting block.

In one or more exemplary embodiments of the present invention, the roller unit further includes an air blower for removing spatters when laser welding.

In one or more exemplary embodiments of the present invention, the laser optic head includes: a head housing mounted at the lower portion of the mounting frame, and provided with an upper portion having a side connected to an optical fiber cable for transmitting the laser beam oscillated by the laser oscillator and a lower portion formed of a laser shooting hole; a collimation lens mounted at an extended portion of the head housing so as to be movable upwardly or downwardly through driving means and adapted to control the size of the laser beam oscillated by the laser oscillator; a first reflector mounted at a side portion in the head housing on a vertical line of the collimation lens and adapted to totally reflect the laser beam in a horizontal direction; a second reflector mounted at the other side in the head housing on a horizontal line of the first reflector and adapted to totally reflect the laser beam reflected by the first reflector in a vertical direction; and a focus lens mounted corresponding to the laser shooting hole of the head housing on the vertical line of the second reflector, and adapted to form a focus of the laser beam reflected by the second reflector and to shoot the laser beam into the joining portion of the joining members.

In one or more exemplary embodiments of the present invention, the driving means includes: a guide rail mounted at both sides of an interior circumference of the extended portion and adapted to guide the collimation lens; a drive motor mounted at an exterior of the extended portion and having a rotation shaft facing downwardly; a driving screw connected to the rotation shaft of the drive motor; and a screw block engaged with the driving screw at the exterior of the extended portion in a state of being connected to the collimation lens.

In one or more exemplary embodiments of the present invention, the drive motor is a step motor, rotation speed and rotating direction of which can be controlled.

A method of selectively brazing or welding according to one or more exemplary embodiments of the present invention includes: providing a laser apparatus of as described herein; and actuating the laser optic head to modify the spot size of the laser beam and project the laser beam into the joining portion of the joining members to selectively perform brazing or welding.

In one or more exemplary embodiments of the present invention, the spot size approximates a width of the joining portion.

In one or more exemplary embodiments of the present invention, the method further includes supplying a filler metal into the laser beam projected by the laser optic head.

In one or more exemplary embodiments of the present invention, the method further includes applying pressure to an upper portion of the joining members so as to control a gap between the joining members when laser welding the joining members.

Figure 1:
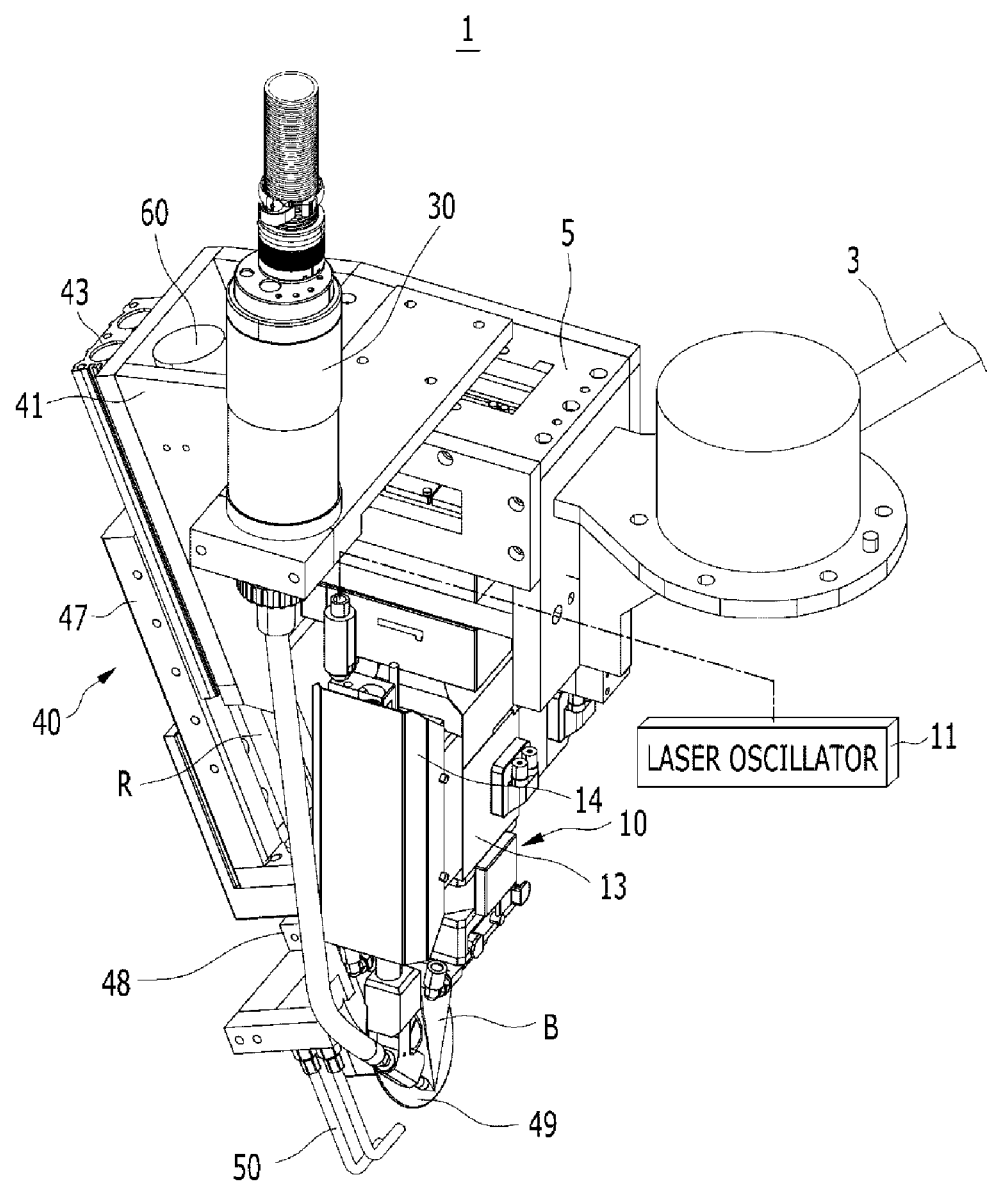
FIG. 1 is a perspective view of a laser apparatus for welding according to an exemplary embodiment of the present invention.

The following legend of the reference numerals is provided for convenience:

| | |
|---|---|
| 1: laser apparatus | 3: arm of robot |
| 5: mounting frame | 10: laser optic head |
| 11: laser oscillator | 13: head housing |
| 14: extended portion | 15: laser shooting hole |
| 16: collimation lens | 17: first reflector |
| 18: second reflector | 19: focus lens |
| 20: driving means | 21: guide rail |
| 22: drive motor | 23: driving screw |
| 24: screw block | 25: controller |
| 30: wire feeder | 40: roller unit |
| 41: mounting bracket | 43: operating cylinder |
| 45: rail | 47: rail block |
| 48: connecting block | 49: roller |
| 50: air blower | 60: sensor |
| P: joining member | B: laser beam |
| G: gap | |

DETAILED DESCRIPTION OF THE EMBODIMENTS

An exemplary embodiment of the present invention will hereinafter be described in detail with reference to the accompanying drawings.

Exemplary embodiments described in this specification and drawings are just exemplary embodiments of the present invention. It is to be understood that there can be various modifications and equivalents included in the spirit of the present invention at the filing of this application.

Figure 2:
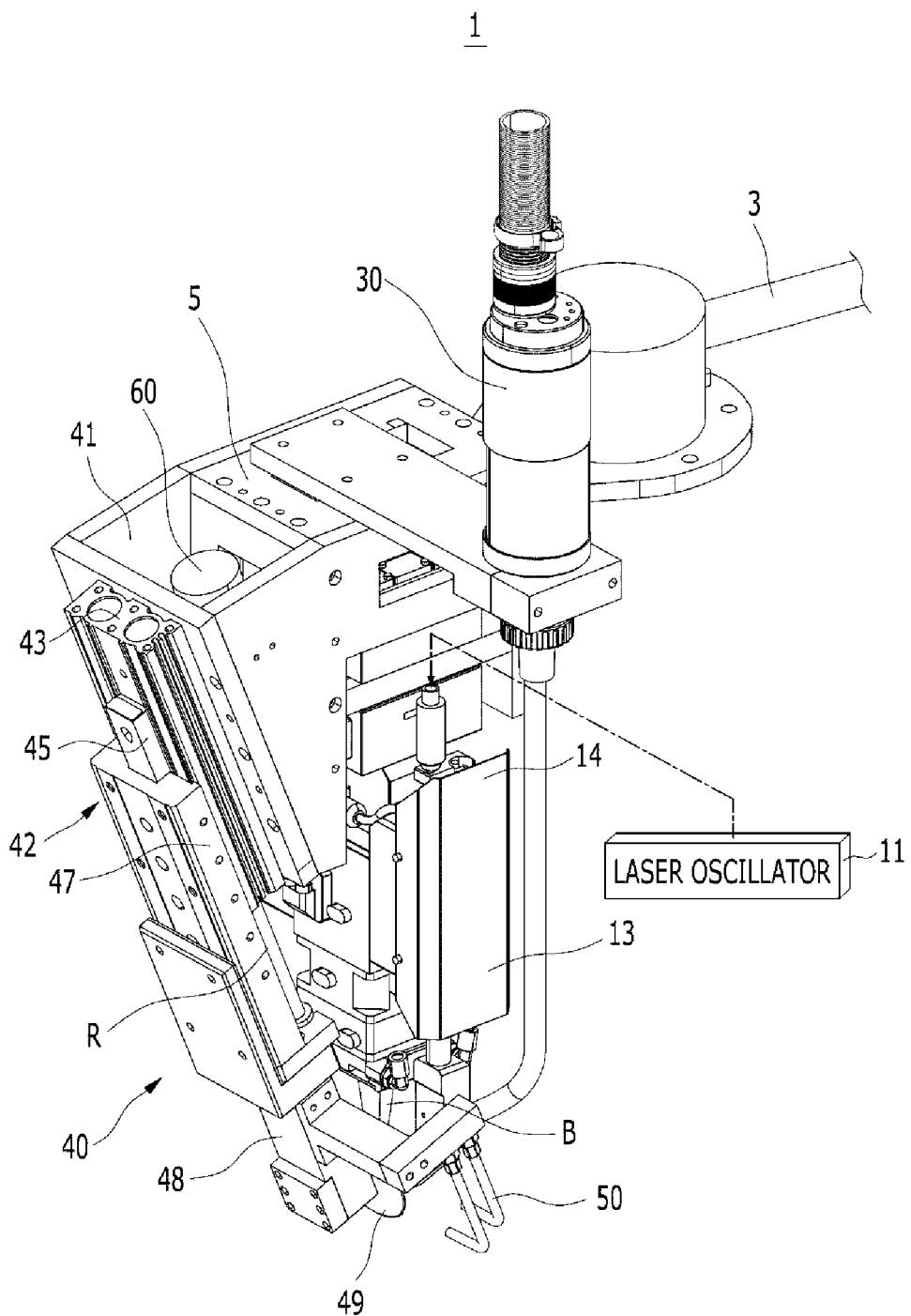
FIG. 2 is another perspective view of a laser apparatus for welding according to an exemplary embodiment of the present invention.
Figure 3:
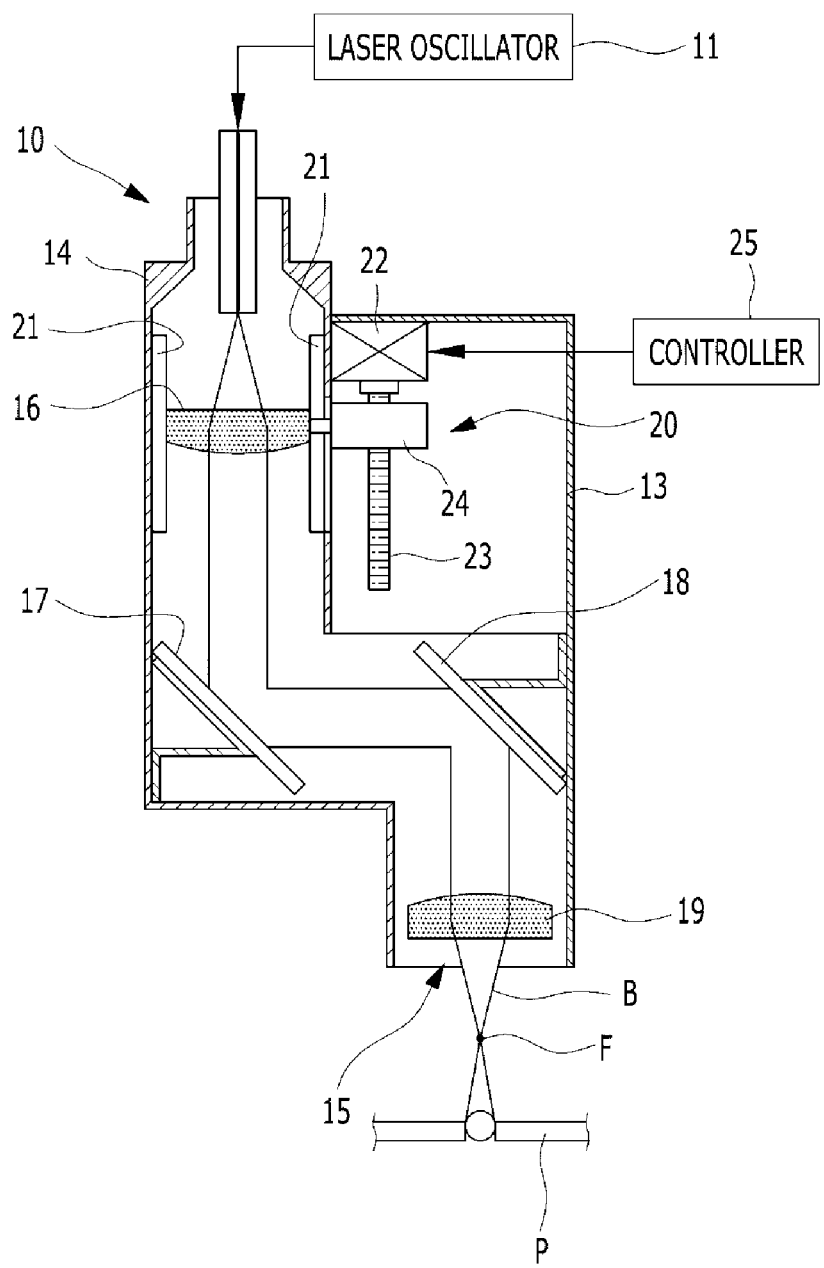
FIG. 3 is a cross-sectional view of a laser optic head applied to a laser apparatus for welding according to an exemplary embodiment of the present invention.

FIG. 1 is a perspective view of a laser apparatus for welding according to an exemplary embodiment of the present invention; FIG. 2 is another perspective view of a laser apparatus for welding according to an exemplary embodiment of the present invention; and FIG. 3 is a cross-sectional view of a laser optic head applied to a laser apparatus for welding according to an exemplary embodiment of the present invention.

Referring to the drawings, a laser apparatus 1 for welding according to an exemplary embodiment of the present invention enables of brazing or laser welding that joins two joining members or panels through one apparatus. Therefore, manufacturing cost and working hours can be reduced and productivity can be improved.

For achieving these purposes, the laser apparatus 1 for welding according to an exemplary embodiment of the present invention, as shown in FIG. 1 and FIG. 2, includes a mounting frame 5, a laser optic head 10, a wire feeder 30, and a roller unit 40, and each element will be described in detail.

Firstly, the mounting frame 5 is mounted at a front end of an arm of a robot 3.

In the present exemplary embodiment, the laser optic head 10 is mounted at a lower portion of the mounting frame 5, changes a spot size of a laser beam B oscillated by a laser oscillator 11, and projects the laser beam B into a joining portion of the joining members P.

The laser optic head 10, as shown in FIG. 3, includes a head housing 13, a collimation lens 16, first and second reflectors 17 and 18, and a focus lens 19.

The head housing 13 substantially has a rectangular shape having a space therein. An upper end of the head housing 13 is mounted at the lower portion of the mounting frame 5.

An extended portion 14 is formed at a side of an upper portion of the head housing 13, and an optical fiber cable is connected to the extended portion 14. The optical fiber cable is adapted to transmit the laser beam oscillated by the laser oscillator 11. A laser shooting hole 15 is formed at a lower portion of the head housing 13.

The collimation lens 16 is mounted at the extended portion 14 of the head housing 13 and is movable upwardly or downwardly through driving means 20. The collimation lens 16 is adapted to control the size (spot size) of the laser beam B oscillated by the laser oscillator 11.

Herein, the driving means 20 include a guide rail 21, a drive motor 22, a driving screw 23, and a screw block 24, and each element will be described in detail.

The guide rail 21 is mounted at both sides of an interior circumference of the extended portion 14 and is adapted to guide the collimation lens 16 stably.

In the present exemplary embodiment, the drive motor 22 is mounted at an exterior of the extended portion 14 and has a rotation shaft facing downwardly. The driving screw 23 is connected to the rotation shaft of the drive motor 22.

Herein, the drive motor 22 is electrically coupled with a controller 25, and can be a step motor. Rotation speed and rotating direction of the drive motor 22 can be controlled according to an output signal of the controller 25.

The driving screw 23 is connected to the rotation shaft of the drive motor 22 so as to rotate according to rotation of the drive motor 22.

In addition, the screw block 24 is engaged with the driving screw 23 at the exterior of the extended portion 14 in a state of being connected to the collimation lens 16.

Therefore, if the drive motor 22 is operated by a control signal of the controller 25, the driving screw 23 rotates clockwise or counterclockwise and the screw block 24 engaged with the driving screw 23 moves upwardly or downwardly on the driving screw 23.

Accordingly, the collimation lens 16 connected to the screw block 24 slides upwardly or downwardly along the guide rail 21 in the extended portion 14.

In the present exemplary embodiment, the first reflector 17 is mounted at a side portion in the head housing 13 on a vertical line of the collimation lens 16 and is adapted to totally reflect the laser beam B in a horizontal direction.

In addition, the second reflector 18 is mounted at the other side portion in the head housing 13 on a horizontal line of the first reflector 17 and is adapted to totally reflect the laser beam B reflected by the first reflector 17 in a vertical direction.

That is, the first reflector 17 and the second reflector 18 reflects the laser beam B oscillated by the laser oscillator 11 and forming the focus controlled through the collimation lens 16 respectively in the horizontal and vertical direction so as to lead the laser beam B into the laser shooting hole 15.

In the present exemplary embodiment, the focus lens 19 is mounted corresponding to the laser shooting hole 15 of the head housing 13 on the vertical line of the second reflector 18.

The focus lens 19 is adapted to form the focus F of the laser beam B reflected from the second reflector 18 and to shoot the laser beam B of high power into the joining portion of the joining members P.

The laser optic head 10 changes the spot size of the laser beam B according to laser brazing or laser welding of the joining members P. These processes will be described in detail, referring to FIG. 4.

Figure 4:
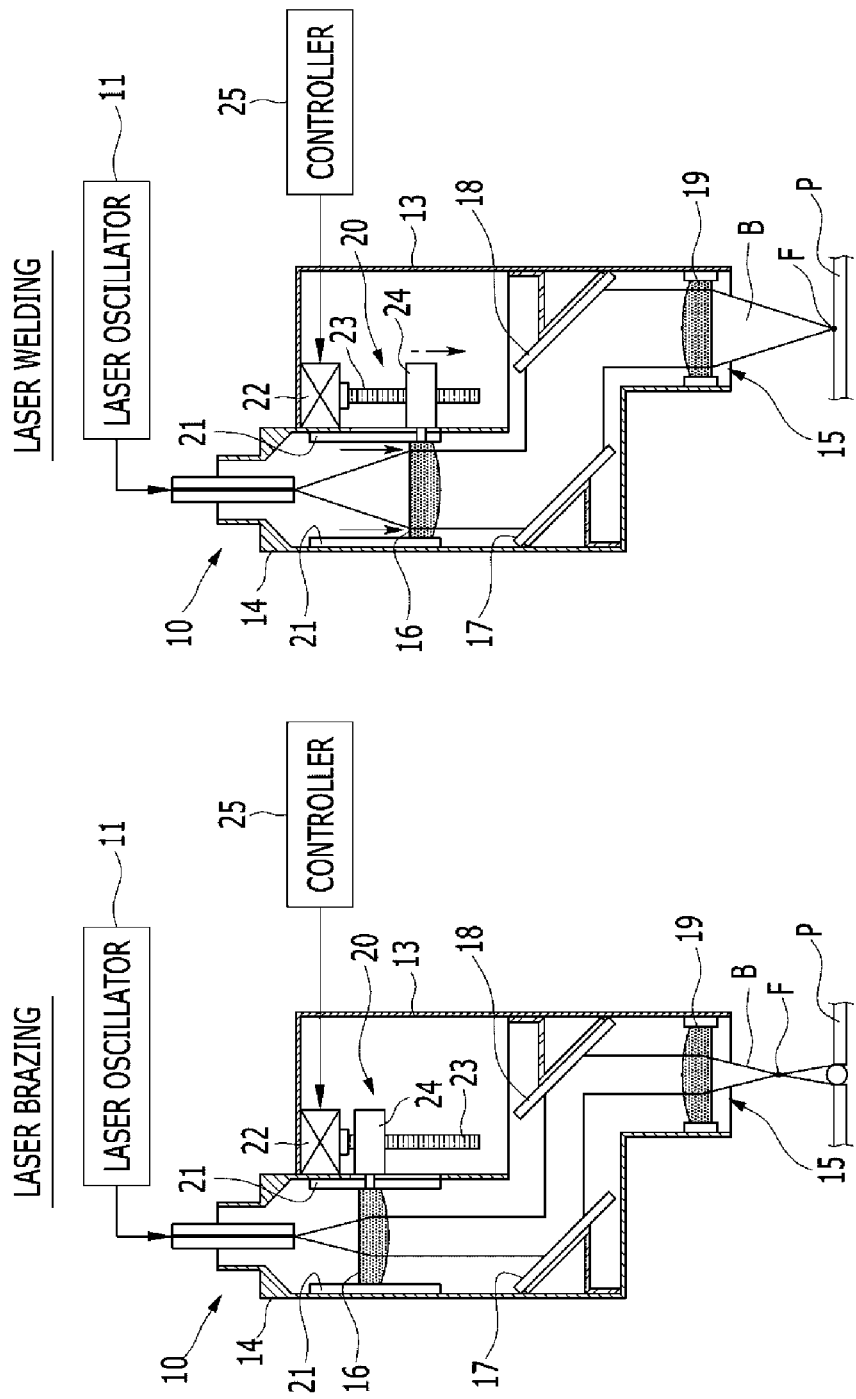
FIG. 4 is an operational state diagram of a laser optic head applied to a laser apparatus for welding according to an exemplary embodiment of the present invention.

FIG. 4 is an operational state diagram of a laser optic head applied to a laser apparatus for welding according to an exemplary embodiment of the present invention.

Referring to FIG. 4, the screw block 24 of the driving means 20 is disposed on the driving screw 23 close to the drive motor 22 when laser brazing the joining member P. Therefore, the collimation lens 16 is positioned at an upper portion of the extended portion 14.

Accordingly, a diameter of the laser beam B oscillated by the laser oscillator 11 is formed to be small by the collimation lens 16 disposed at the upper portion of the extended portion 14 of the head housing 13. The laser beam B passes through the focus lens 19 as a consequence of being reflected by the first and second reflectors 17 and 18.

Then, the laser beam B forms the focus F at a position apart from and above the joining members P by the focus lens 19, and the laser beam B spreads toward the joining members P with respect to the focus F so as to be shot into joining members P with the diameter thereof increased. Therefore, the laser brazing is performed.

On the contrary, the driving screw 23 rotates through the operation of the drive motor 22 and the screw block 24 moves downwardly from an initial position when laser welding joining members P. Therefore, the collimation lens 16 moves downwardly along the guide rail 21 together with the screw block 24 and is disposed at a lower portion of the extended portion 14.

Accordingly, the diameter of the laser beam B oscillated by the laser oscillator 11 becomes larger than that of the laser beam B at the brazing by the collimation lens 16 positioned at the lower portion of the extended portion 14. The laser beam B passes through the focus lens 19 as a consequence of being reflected by the first and second reflectors 17 and 18.

Then, the laser beam B is shot into the joining members P with the focus F formed on a surface of the joining portion of the joining members P by the focus lens 19. Therefore, the laser welding is performed.

In the present exemplary embodiment, the wire feeder 30 is adapted to supply a filler metal into the laser beam B shot from the laser optic head 10. The wire feeder 30 is disposed at a side of the laser optic head 10 and is mounted at the mounting frame 5. The filler metal is melted by the laser beam B.

The wire feeder 30 is used only when the laser brazing. That is, the filler metal supplied into the laser beam B shot from the laser optic head 10 is melted and the joining members P are brazed by the molten filler metal.

In addition, the roller unit 40, as shown in FIG. 2, is adapted to apply pressure to an upper portion of the joining members P so as to control a gap between the joining members P when the laser welding of the joining members P. The roller unit 40 is mounted at the mounting frame 5 ahead of the laser optic head 10 and is movable upwardly or downwardly to the mounting frame 5.

The roller unit 40 includes a mounting bracket 41, an operating cylinder 43, and a roller 49.

The mounting bracket 40 is mounted at the mounting frame 5 ahead of the laser optic head 10.

Herein, the mounting bracket 41 can be slanted with reference to the mounting frame 5 by a predetermined angle.

In the present exemplary embodiment, the operating cylinder 43 includes an operating rod R and is mounted at a side portion of the mounting bracket 41. The operating rod R is mounted at the operating cylinder 43 and is movable upwardly or downwardly with reference to the operating cylinder 43.

In addition, the roller 49 is connected to a front end of the operating rod R of the operating cylinder 43, and is movably mounted at the operating cylinder 43 through guide means 42. Therefore, the roller 49 is slidably contacted to an upper surface of the joining members P depending on movement of the operating rod R so as to apply pressure to the joining members P.

Herein, the guide means 42 includes a rail 45 mounted at a surface of the operating cylinder 43 along a length direction thereof and a rail block 47 slidably mounted on the rail 45. The rail block 47 is connected to the operating rod R of the operating cylinder 43, and the roller 49 is mounted at a front end of the rail block 47 through a connecting block 48.

The guide means 42 guides movement of the roller 49 stably when the operating rod R moves upwardly or downwardly.

In addition, the guide means 42 supports the roller 49 so as to apply pressure to the joining members P stably when the roller 49 applies the pressure to the joining members P.

In the present exemplary embodiment, the roller unit 40 further includes an air blower 50 beside the roller 49 so as to remove spatters generated when the laser welding.

When the joining members P are welded by the laser beam B shot by the laser optic head 10, the air blower 50 prevents the spatters generated from the joining members P from being attached to a surface of the joining member P or the focus lens 19 of the laser optic head 10.

Meanwhile, a sensor 60 is mounted at the mounting bracket 41 according to the present exemplary embodiment. The sensor 60 is used for inspecting welding quality when the laser welding.

Hereinafter, operation of the laser apparatus 1 for welding according to an exemplary embodiment of the present invention will be described in detail.

Figure 5:
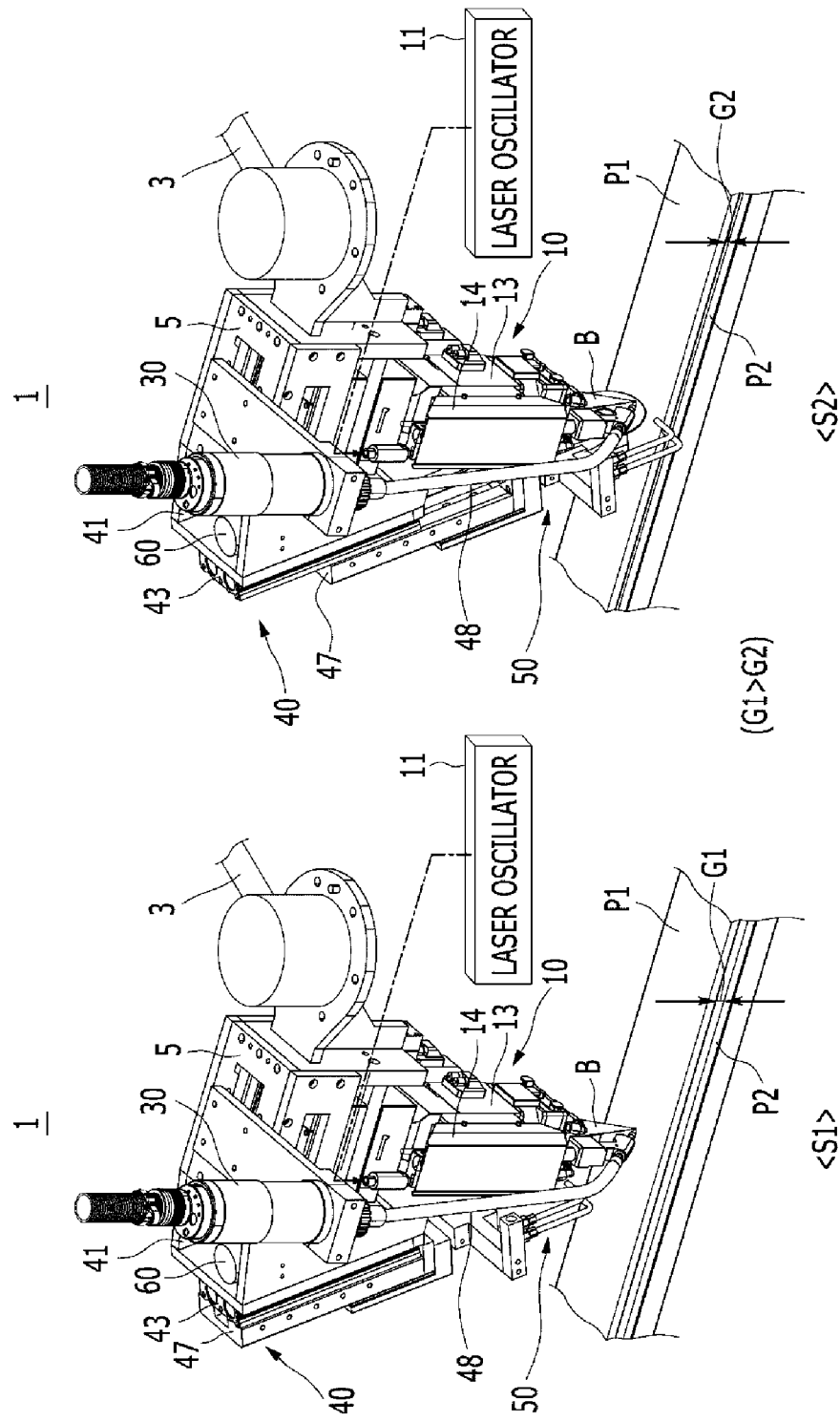
FIG. 5 is an operational state diagram of a laser apparatus for welding according to an exemplary embodiment of the present invention.

FIG. 5 is an operational state diagram of a laser apparatus for welding according to an exemplary embodiment of the present invention.

As shown in FIG. 4, the laser apparatus 1 for welding according to an exemplary embodiment of the present invention changes a position of the collimation lens 16 in the head housing 13 by the driving means 20 when laser brazing of the joining members P. Therefore, the diameter of the laser beam B oscillated by the laser oscillator 11 is controlled to perform the brazing of the joining members P.

At this time, the wire feeder 30 supplies the filler metal into the laser beam B continuously until the brazing is completed such that the brazing of the joining members P is smoothly performed.

In addition, the collimation lens 16, as shown in FIG. 4, is moved to the lower portion of the extended portion 14 by the driving means 20 when the laser welding of the joining members P is performed.

Therefore, the focus F of the laser beam B, as shown in <S1> of FIG. 5, is positioned on the surface of the joining portion of the joining member P.

In this case, the gap G1 formed between the joining member P1 and the joining member P2 is larger than that required for the laser welding.

At this state, the operating rod R of the roller unit 40 moves downwardly and the rail block 47 as well as the operating rod R slides downwardly along the rail 45.

Then, the roller 49 mounted at the front end of the rail block 47 applies load of the operating cylinder 43 to the joining members P1 in a state of being slidably contacted on the surface of the joining members P1.

Therefore, the gap G2 formed between the joining member P1 and the joining member P2 becomes smaller than the gap G1 shown in <S1> of FIG. 5.

That is, the roller unit 40 controls a size of the gap formed between the joining member P1 and the joining member P2 to a size required for the laser welding and maintains the gap to have a constant size during the laser welding. Therefore, welding quality can be improved.

As described above, the laser apparatus 1 for welding according to an exemplary embodiment of the present invention enables of brazing or laser welding that joins two joining members P or the panels through one apparatus. Therefore, manufacturing cost and working hours can be reduced and productivity can be improved.

In addition, (i) it is possible to change the spot size of the laser beam B, (ii) the wire feeder 30 enables supplying of filler metal, and (iii) the roller unit 40 can apply pressure to the joining members so as to maintain the gap G between the joining members P. Therefore, laser brazing and welding can be simultaneously performed without an additional apparatus and at a higher quality.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of selectively brazing or welding, the method comprising:

providing a laser apparatus comprising a laser optic head adapted and configured to modify a spot size of a laser beam oscillated by a laser oscillator and to project the laser beam into a joining portion of joining members, wherein the laser optic head is adapted and configured to modify the spot size to selectively perform brazing or welding, and the laser apparatus further comprises a mounting frame and a roller unit, the roller unit adapted to apply pressure to an upper portion of the joining members so as to control a gap between the joining members when laser welding the joining members; and actuating the laser optic head to modify the spot size of the laser beam and project the laser beam into the joining portion of the joining members to selectively perform brazing or welding, wherein the roller unit comprises:
a mounting bracket mounted at the mounting frame ahead of the laser optic head;
an operating cylinder provided with an operating rod and mounted at a side portion of the mounting bracket, the operating rod being mounted so as to be movable upwardly or downwardly; and
a roller connected to a front end of the operating rod, movably mounted at the operating cylinder through guide means, and adapted to slidably contact on an upper surface of the joining member according to the movement of the operating rod and to apply pressure to the joining members, and
wherein the guide means comprise:
a rail mounted at a surface of the operating cylinder along a length direction thereof, and
a rail block slidably mounted on the rail, connected to the operating rod, and having a front end at which the roller is mounted through a connecting block.

2. The method of claim 1, wherein the spot size approximates a width of the joining portion.

3. The method of claim 1, further comprising supplying a filler metal into the laser beam projected by the laser optic head.

4. The method of claim 1, further comprising applying pressure to an upper portion of the joining members so as to control a gap between the joining members when laser welding the joining members.

5. The method of claim 1, wherein the laser apparatus further comprises a wire feeder supplying a filler metal into the laser beam projected by the laser optic head so as to perform the brazing or welding.

6. The method of claim 5, wherein the wire feeder is disposed at a side portion of the laser optic head and is mounted at the mounting frame.

7. The method of claim 1, wherein the roller unit is mounted at the mounting frame and is movable upwardly or downwardly to the mounting frame.

8. The method of claim 1, wherein the roller unit further comprises an air blower for removing spatters when laser welding.

9. The A method of selectively brazing or welding, comprising:
providing a laser apparatus comprising a laser optic head adapted and configured to modify a spot size of a laser beam oscillated by a laser oscillator and to project the laser beam into a joining portion of joining members, wherein the laser optic head is adapted and configured to modify the spot size to selectively perform brazing or welding, and the laser apparatus further comprises a mounting frame; and
actuating the laser optic head to modify the spot size of the laser beam and project the laser beam into the joining portion of the joining members to selectively perform brazing or welding,
wherein the laser optic head comprises:
a head housing mounted at a lower portion of the mounting frame, and provided with an upper portion having a side connected to an optical fiber cable for transmitting the laser beam oscillated by the laser oscillator and a lower portion formed of a laser shooting hole;
a collimation lens mounted at an extended portion of the head housing so as to be movable upwardly or downwardly through driving means and adapted to control the size of the laser beam oscillated by the laser oscillator;
a first reflector mounted at a side portion in the head housing on a vertical line of the collimation lens and adapted to totally reflect the laser beam in a horizontal direction;
a second reflector mounted at the other side in the head housing on a horizontal line of the first reflector and adapted to totally reflect the laser beam reflected by the first reflector in a vertical direction; and
a focus lens mounted corresponding to the laser shooting hole of the head housing on the vertical line of the second reflector, and adapted to form a focus of the laser beam reflected by the second reflector and to shoot the laser beam into the joining portion of the joining members,
wherein the driving means comprise:
a guide rail mounted at both sides of an interior circumference of the extended portion and adapted to guide the collimation lens;
a drive motor mounted at an exterior of the extended portion and having a rotation shaft facing downwardly;
a driving screw connected to the rotation shaft of the drive motor; and
a screw block engaged with the driving screw at the exterior of the extended portion in a state of being connected to the collimation lens.

10. The method of claim 9, wherein the drive motor is a step motor, rotation speed and rotating direction of which can be controlled.

* * * * *